(12) United States Patent
Obrador

(10) Patent No.: US 7,483,059 B2
(45) Date of Patent: Jan. 27, 2009

(54) SYSTEMS AND METHODS FOR SAMPLING AN IMAGE SENSOR

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 10/836,745

(22) Filed: Apr. 30, 2004

(65) Prior Publication Data

US 2005/0243183 A1 Nov. 3, 2005

(51) Int. Cl.
*H04N 5/228* (2006.01)
(52) U.S. Cl. .................... 348/222.1; 348/297
(58) Field of Classification Search ........... 348/297, 348/222.1, 572; 382/118, 274; 345/426
See application file for complete search history.

(56) References Cited

U.S. PATENT DOCUMENTS

| | | | | |
|---|---|---|---|---|
| 5,432,864 | A * | 7/1995 | Lu et al. ............... | 382/118 |
| 6,070,140 | A * | 5/2000 | Tran ................... | 704/275 |
| 6,324,001 | B2 * | 11/2001 | Tabata ................. | 359/462 |
| 6,724,826 | B1 * | 4/2004 | Varian ................. | 375/240.29 |
| 6,795,578 | B1 * | 9/2004 | Kotani et al. .......... | 382/180 |
| 6,801,719 | B1 * | 10/2004 | Szajewski et al. ...... | 396/333 |
| 6,879,734 | B2 * | 4/2005 | Chen et al. ........... | 382/275 |
| 6,928,231 | B2 * | 8/2005 | Tajima ................ | 386/46 |
| 7,043,019 | B2 * | 5/2006 | Tehranchi et al. ...... | 380/218 |
| 7,173,658 | B2 * | 2/2007 | Kikuchi ............... | 348/275 |
| 7,227,977 | B1 * | 6/2007 | Dotsenko .............. | 382/118 |
| 7,327,890 | B2 * | 2/2008 | Fredlund .............. | 382/218 |
| 2002/0116196 | A1 * | 8/2002 | Tran .................. | 704/270 |
| 2003/0012427 | A1 * | 1/2003 | Martinez-Uriegas et al. | 382/162 |
| 2003/0063219 | A1 * | 4/2003 | Bellers ............... | 348/572 |
| 2004/0120606 | A1 * | 6/2004 | Fredlund .............. | 382/305 |
| 2007/0177027 | A1 * | 8/2007 | Nakamura et al. ....... | 348/222.1 |

* cited by examiner

*Primary Examiner*—Lin Ye
*Assistant Examiner*—Amy Hsu

(57) ABSTRACT

Systems and methods according to the present invention provide techniques which adjust the sampling scheme associated with an image sensor in order to provide high quality renditions, e.g., printed or displayed outputs. The sampling scheme can be varied on a frame by frame basis (or less frequently) to output more samples from the image sensor for regions which are predicted to contain more perceptually significant information and to output fewer samples for regions which are predicted to be less perceptually significant. Various parameters can be used as proxies for perceptual significance. For example, in images which contain people, faces can be characterized as more perceptually significant and regions which are predicted to contain faces can be sampled more densely than regions which are not predicted to contain faces. Alternatively, the spatial frequency content of data captured by an image sensor can be measured to identify regions of higher and lower spatial frequency content. Regions with higher spatial frequency content will typically contain perceptually more significant image features, e.g., edges and textures, than regions having lower spatial frequency content. Accordingly, the image sensor can be programmed to sample the former more densely.

33 Claims, 9 Drawing Sheets

SYSTEMS AND METHODS FOR SAMPLING AN IMAGE SENSOR

BACKGROUND

The present invention relates generally to image processing systems and, more particularly, to methods and systems for sampling an image sensor.

Many different types of image capture devices are available for consumer and business use today. Examples of image capture devices include scanners, digital still cameras, digital video cameras and hybrid devices. All of these devices include image sensors which capture pixel data associated with images to be processed. Today, most image sensors are created using one of three different technologies: self-scanned diode technology, charge injection device (CID) technology and charge-coupled device (CCD) technology. Each of these three technologies employ a semiconductor fabrication process that has inherent limitations with respect to the ability to integrate the image sensors with other circuits on the same chip. However, more recently, it has become possible to use CMOS processes to produce image sensors which allows for a higher level of integration between e.g., image sensors and other digital circuitry.

Referring to FIG. 1, one challenge confronted by designers of image sensors, as well as designers of devices and systems which employ image sensors, is to provide a data transfer mechanism 10 (e.g., a data bus) which transfers the image data from the image sensor 12 to another device, e.g., an image processor 14, sufficiently quickly to satisfy a particular application's need for raw image data. For high speed image applications, e.g., high frame rate video recording applications, bandwidth limitations associated with the data transfer mechanism 10 require the image sensor 12 to be sampled for each captured image frame, i.e., the image sensor 10 does not transfer data associated with each and every available image sensor pixel for each captured image frame. For example, the image sensor 12 can be sampled at VGA resolution (640× 480) and the resulting sampled data can be transferred over the data transfer mechanism 10 at a rate which is less than or equal to the bandwidth limitations associated with that device. Conventional image sampling techniques do not vary from frame to frame, e.g., sampling the image sensor uniformly from frame to frame to reduce the sample size to VGA resolution. However, CMOS image sensors (as well as potentially other types of sensors) have the capability to be randomly accessed, therefore allowing variable sampling from frame to frame.

Accordingly, it would be desirable to provide techniques and devices which intelligently sample image sensor arrays in a manner which may vary from frame to frame to produce high quality renditions of the images in an output medium.

SUMMARY

Systems and methods according to the present invention provide techniques which adjust the sampling scheme associated with an image sensor.

According to an exemplary embodiment of the present invention, a method for sampling an image sensor includes the steps of evaluating a captured image, determining a sampling allocation for the image sensor based upon the step of evaluating and sampling a first region of the image sensor at a first sampling density and a second region of the image sensor at a second sampling density based upon the determined sampling allocation.

According to another exemplary embodiment of the present invention, an image processing system includes an image sensor for capturing an image, wherein the image sensor includes an array of image sensing pixels, and wherein the image sensor is controllable to vary a sampling density for at least two regions across the array of image sensing pixels, a processor for evaluating a captured image and for allocating a first sampling density to a first region of the image sensor and a second sampling density to a second region of the image sensor based on the evaluation of the captured image and a data transfer mechanism for transferring samples associated with a next image from the image sensor to the processor, wherein the samples are generated based on the first and second sampling densities

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 2:
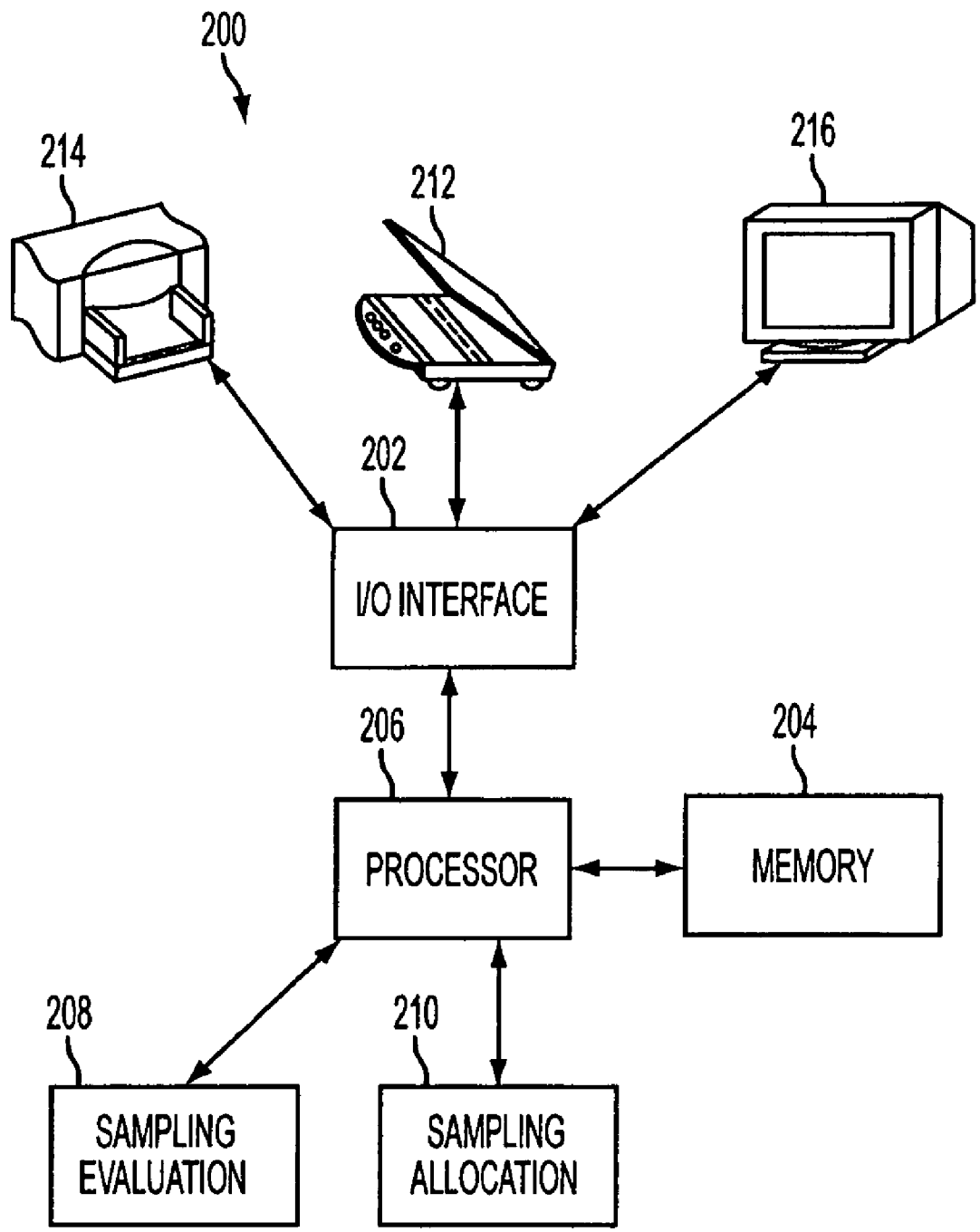
FIG. 2 is an exemplary image processing system according to an exemplary embodiment of the present invention.

In order to provide some context for this discussion, an image processing system according to an exemplary embodiment of the present invention will first be described with respect to FIG. 2. Therein, an image processing system 200 includes an I/O interface 202 and a memory device 204 that are connected to a processor 206. These components can be packaged together in, for example, a personal computer. The image processing system 200 further includes a sampling evaluation function 208 and a sampling allocation function 210 which are connected to processor 206. Although the components 202-210 are illustrated in FIG. 2 as separate components of the image processing system 200, two or more of these components may be integrated, thereby decreasing the number of components included in the image enhancing system. Additionally, the components 208-210 may be implemented in any combination of hardware, firmware and software. According to one exemplary embodiment, components 208-210 can be implemented as a software program(s) that perform the functions of the components 208-210, as described below, when executed by the processor 206. Image capture device 212, e.g., a scanner, a digital still camera or a digital video camera, is connected via I/O interface 202 to capture images for processing by image processing system 200. The image capture device 212 will include one or more image sensors (not shown) having variable sampling schemes which are controlled according to the present invention, as described in more detail below. The I/O interface may be a USB port, a serial port or any other interface port that is designed to interface the image capture device 212 to the image processing system 200. Alternatively, the I/O interface 202 may be a network interface to receive digital images from a local network (not shown) or from the Internet (not shown). Printer 214 and monitor 216 are connected to the image processing system 200 via I/O interface 202 to provide output devices for, e.g., the processed image data.

Figure 1:
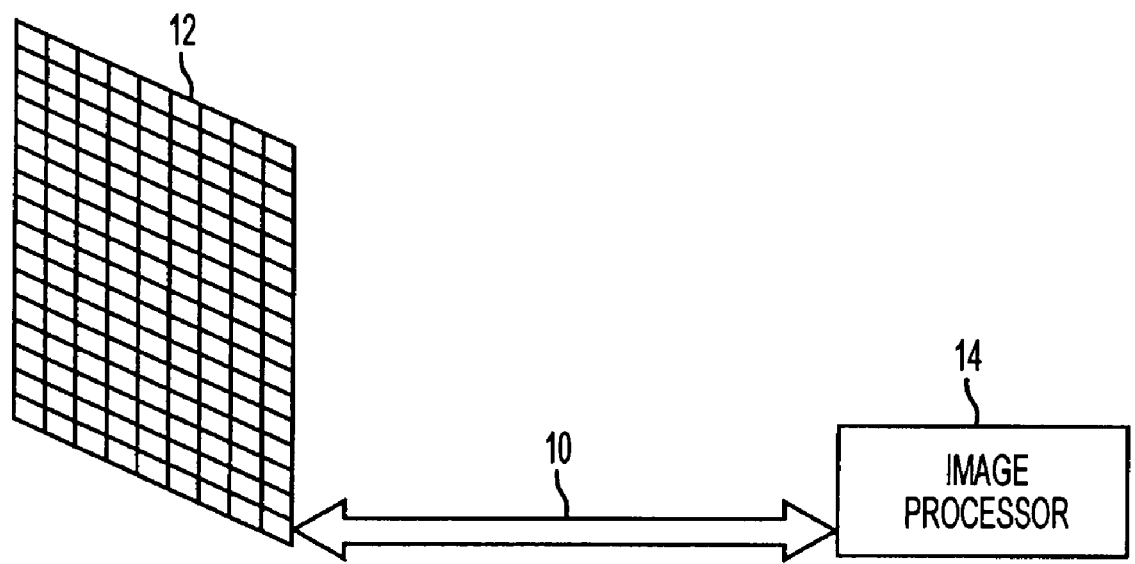
FIG. 1 depicts a conventional image sensor, data transfer mechanism and image processor.
Figure 3:
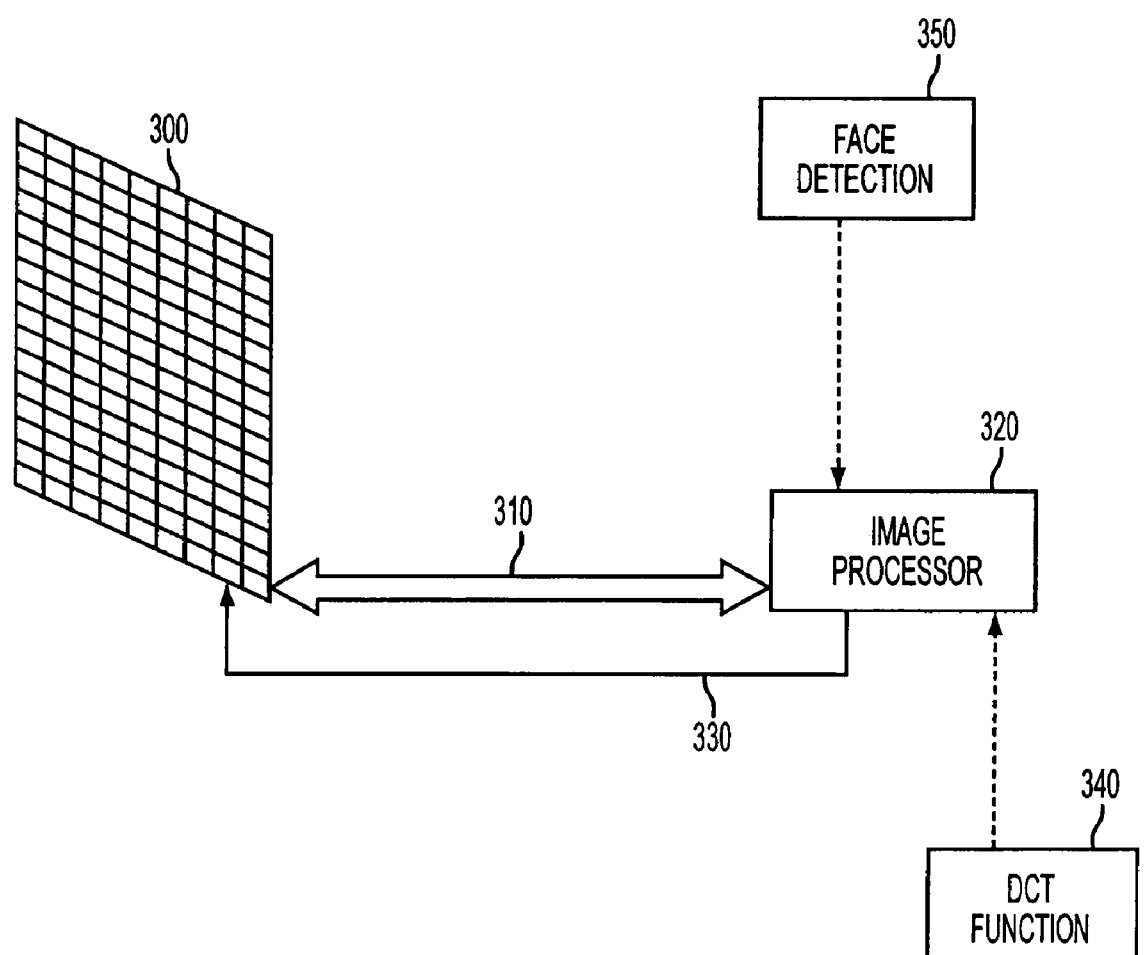
FIG. 3 depicts an image sensor, data transfer mechanism and image processor with a feedback mechanism according to an exemplary embodiment of the present invention.

Although reference will be made to various components of the exemplary system of FIG. 2, a subset of those components can be focused on for discussion purposes, as seen in FIG. 3. Therein, an image sensor device 300 is connected to an image processor 320 via a data transfer mechanism 310, e.g., a data bus. According to one exemplary embodiment of the present invention, the image sensor device 300 is a CMOS image sensor device, however those skilled in the art will appreciate that the image sensor device can be any sensor device which permits its sampling scheme to be changed to enable varying the sampling density as described herein. Unlike the structure of FIG. 1, exemplary embodiments of the present invention provide a feedback mechanism 330 from the image processor 320 to the image sensor device 300. This feedback mechanism 330 can be used to reprogram the image sensor device 300 with respect to the way in which it samples its pixel array.

For example, according to exemplary embodiments of the present invention, methods and systems are provided which adjust the sampling scheme associated with the image sensor device 300 in order to provide high quality renditions, e.g., printed or displayed outputs. The sampling scheme can be varied on a frame by frame basis (or less frequently) to output more samples from the image sensor for regions which are, for example, predicted to contain more perceptually significant information and to output fewer samples for regions of a captured image which are predicted to be less perceptually significant. Various parameters can be used as proxies for perceptual significance. For example, in images which contain people, faces can be characterized as more perceptually significant and regions which are predicted to contain faces can be sampled more densely than regions which are not predicted to contain faces. Alternatively, the spatial frequency content of data captured by an image sensor can be measured to identify regions of higher and lower spatial frequency content. Since those regions with lower spatial frequency content can be reconstructed using fewer samples than those regions with higher spatial frequency content (to provide the same rendered quality of the reconstructed image), the sampling density of the sensor can be varied according to the regional spatial frequency content.

Figures 4, 5:
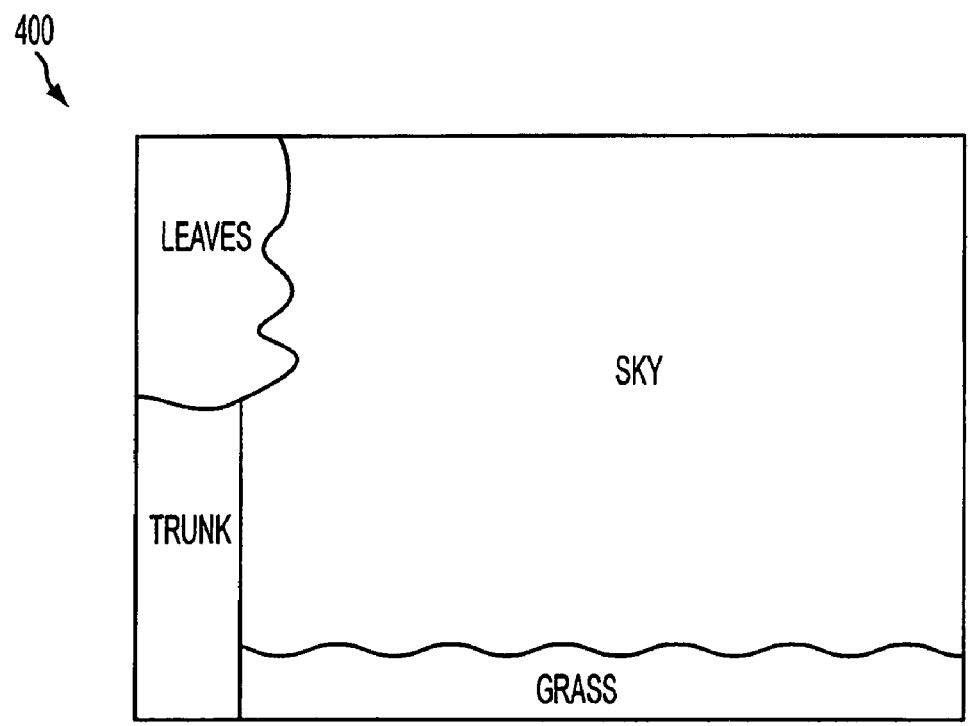
FIG. 4 is an image used to describe exemplary embodiments of the present invention.
FIG. 5 illustrates processing of the image of FIG. 4 according to an exemplary embodiment of the present invention.

To further understand the manner in which image sensor 300 can employ a variable sampling scheme according to the present invention, consider the exemplary image of FIG. 4. Therein, the image 400 includes a tree with a tree trunk and leaves, sky and grass. The image 400 has already been captured by image sensor 300 and transferred to image processor 320 via data transfer mechanism 310. The image 400 is then processed to determine a sampling allocation which can, for example, be used to output samples associated with the next image captured by the image sensor 300. In this example, spatial frequency content is used to determine the sampling allocation. Thus, the image 400 is processed to determine the spatial frequency content associated with regions thereof. This can be accomplished in a number of different ways, one of which is described below.

To determine the spatial frequency content associated with the image, blocks of pixels can be processed to transform their pixel data into the frequency domain using, e.g., a discrete cosine transform (DCT) function 340. According to one exemplary embodiment of the present invention, the DCT function 340 employed to provide information regarding the spatial frequency content for sampling allocation can be the same DCT function 340 that is also used for video compression. For example, an MPEG or JPEG compression device will typically include a DCT function 340 that is used as part of a video compression process (described in more detail below). This DCT function 340 can be reused in exemplary embodiments of the present invention to provide information about the spatial frequency content of regions of the captured image. For example 8 pixel by 8 pixel blocks of image data can be processed by the DCT function 340 to generate DCT coefficients indicative of the spatial frequency of the block being processed. This information can then be used in a number of different ways to allocate samples for image sensor 300. For example, spatial frequency bins can be predetermined, e.g., using a training system which analyzes a large number of images for their spatial frequency content to determine a mapping between DCT coefficients and the desired number of bins. For example, a range of DCT coeffiecient values can be determined for each desired bin. Then, in operation, the DCT coefficients which are determined for an image being processed can be compared to the predetermined bin values to categorize each region in the image being processed. The entire captured image can be processed in this manner, as exemplified by FIG. 5, wherein some exemplary blocks are referenced using column and row numbers. For purposes of illustration, the exemplary blocks shown in FIG. 5 are much larger than they would be in practice if 8×8 pixel blocks were being processed. The various blocks contain image portions which will have different spatial frequency content. For example, blocks (1,1), (1,2) and (1,3) include the leaves from the tree on the left hand side of image 400 and would be expected to have a higher spatial frequency content than the image blocks which contain only the sky, e.g., block (5,3). Once the spatial frequency content for each block in the captured image 400 is determined then this information can be used by image processor 320 to determine the sampling allocation for the next frame to be captured by image sensor 300. There are a number of different ways to perform this allocation.

Figure 6:
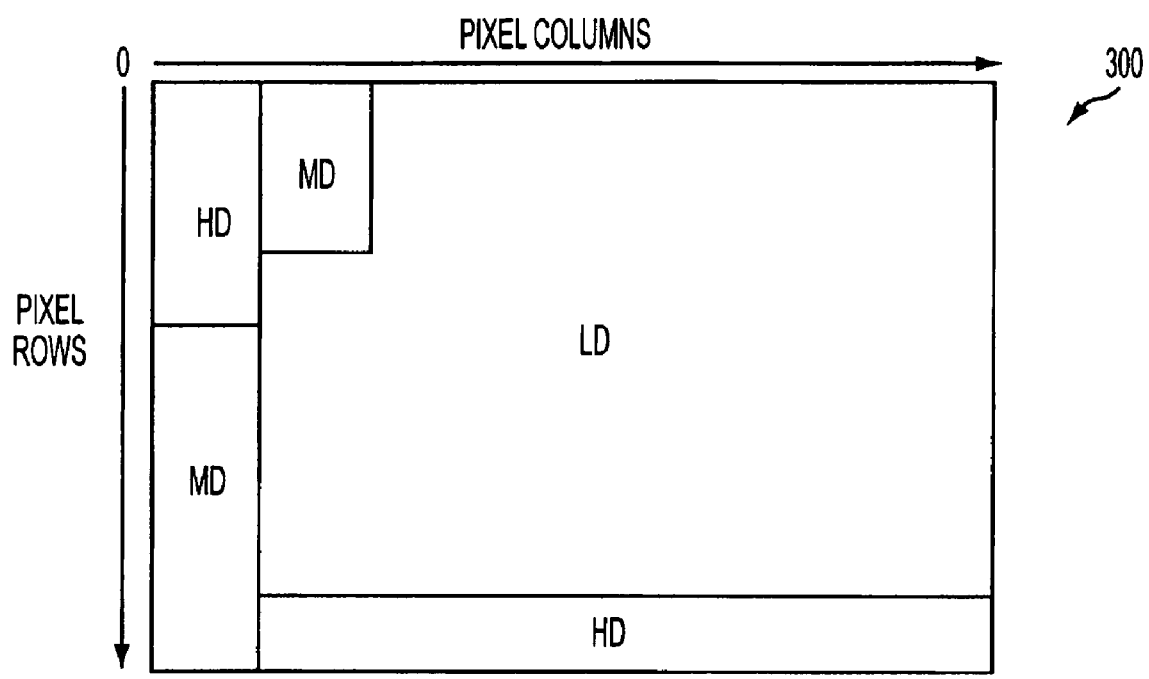
FIG. 6 depicts an exemplary sampling scheme for an image sensor according to an exemplary embodiment of the present invention.

One way, as mentioned above and shown in FIG. 5, is to bin the spatial frequency content values which are output from the DCT function 340 into a predetermined number of groups, e.g., three groups using, for example, predetermined DCT coefficient ranges to map processed image regions into spatial frequency categories. Thus, in FIG. 5 each captured image block has been categorized as containing high spatial frequency content (HF), medium spatial frequency content (MF) or low spatial frequency content (LF). This categorization can then be used to allocate sampling densities to corresponding regions in the next image to be captured. For example, based on the spatial frequency content of the blocks shown in FIG. 5, the sampling density regions illustrated in FIG. 6 can be identified by processor 320, wherein the sampling density regions are denoted high sampling density (HD), medium sampling density (MD) and low sampling density (LD). This mapping can then be used to program the image sensor 300 to sample its pixels as shown in FIG. 6. Purely as an illustrative example, and using 8×8 pixel blocks, each HD block could be sampled at every other pixel within the block, each MD block could be sampled at every fourth pixel within the block and each LD block could be sampled at every eighth pixel within the block. Once the processor 320 has determined the sampling density allocation for the next image frame(s), it transfers this information to the image sensor 300 so that the image sensor 300 can be reprogrammed to sample the designated pixels for the next image to be captured. Those samples are then output through data transfer mechanism 310 to image processor 320 where the process can be repeated, either every frame or less frequently.

It will be appreciated that the captured images can then be stored and/or output in any desired manner. The resulting output images will be perceived to be higher quality renditions than, for example, images which are sampled uniformly. Using the foregoing image 400 as an example, a printed version of the image captured in accordance with the present invention will be perceived by a user to have higher quality because the leaves of the tree and the blades of grass will be printed with a higher resolution than would be possible if the entire image 400 was sampled uniformly, given bandwidth limitations of the data transfer mechanism 310.

The mapping between the regions identified by processor 320 as having a predetermined level of spatial frequency content (e.g., HF, MF, and LF) and the sampling density regions (e.g., HD, MD and LD) need not be 1:1. The mapping may be optimized to balance sampling allocation indicated based on the processed determination of spatial frequency distribution with the bandwidth available via the data transfer mechanism 310. More or fewer than three bins can be used to categorize the level of spatial frequency content and/or more or fewer than three sampling densities of the image sensor 300 can be provided. Alternatively, each block analyzed by processor 320 can be assigned its own sampling density. For example, the output of the DCT function 340 can be used to generate an ordered block list. Each block in the list can be assigned a sampling density using, for example, a Lagrangian optimization. An example of a Lagrangian optimization process is described in "Image and Video Compression", by Antonio Ortega et al., IEEE Signal Processing Magazine, November 1998, pp. 23 et. seq., the disclosure of which is incorporated here by reference.

Figure 7:
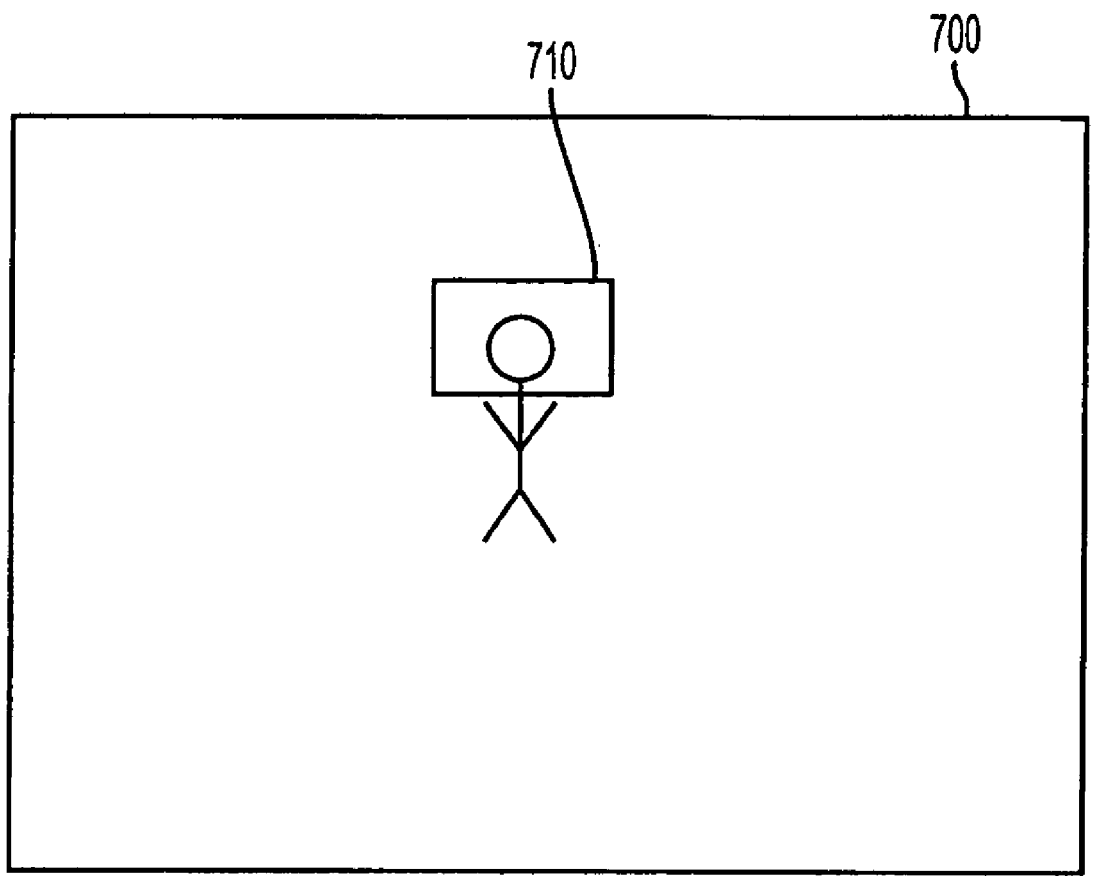
FIG. 7 depicts another image used to describe exemplary embodiments of the present invention.
Figure 8:
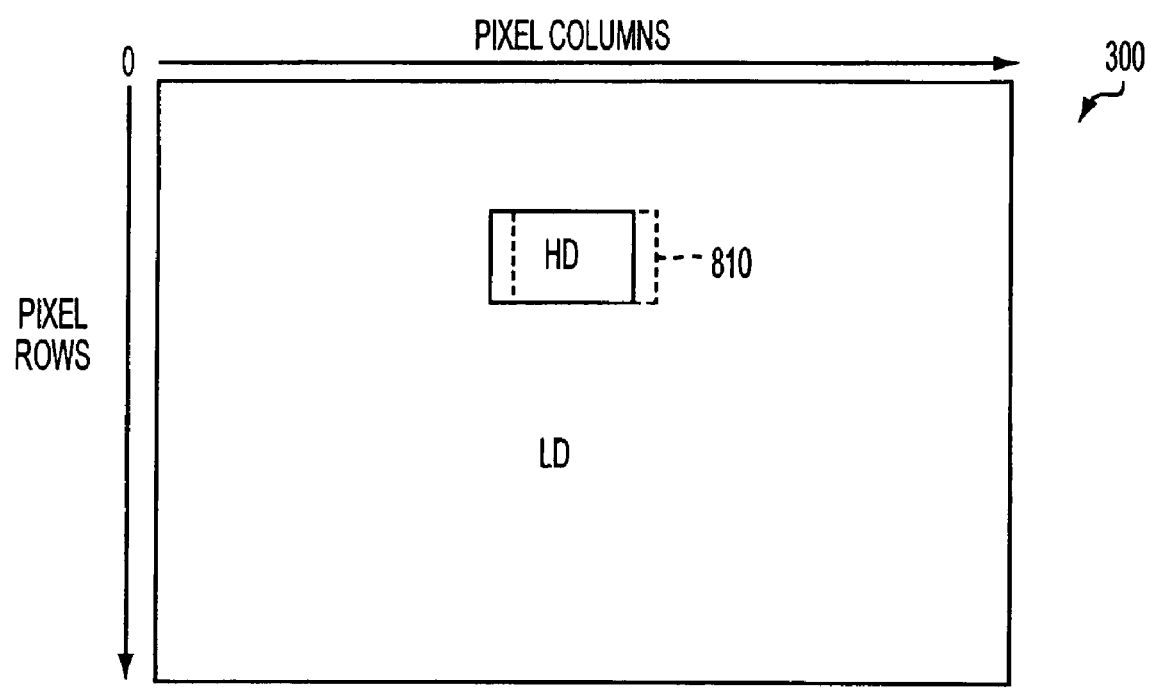
FIG. 8 illustrates an exemplary sampling scheme for an image sensor based on processing of the image of FIG. 7 according to an exemplary embodiment of the present invention.

Various characteristics/parameters, in addition to (or instead of) spatial frequency content, can be used in determining sample allocation for image sensor 300. For example, for images which include people, the ability to render faces with high resolution provides users with better perceived quality. Thus, according to exemplary embodiments of the present invention, a region 710 of an image 700 which includes a face can be sampled with higher sampling density than the remainder of the image 700 as shown in FIG. 7. To accomplish this, a captured image is processed in image processor 320 to detect one or more faces. Face detection function 350 can be implemented using a face detection algorithm, e.g., that described in an article authored by H. Rowley et al., entitled "Neural Network-Based Face Detection, IEEE PAMI, Volume 20, pp. 22-38, 1998, the disclosure of which is incorporated here by reference. When one or more regions 710 are identified as including a face, the image processor 320 can then assign that region with a relatively high sampling density (HD) and the remainder of the image 700 with a lower sampling density (LD), as indicated by FIG. 8, by sending suitable commands/information to the image sensor 300 via feedback mechanism 330. For example, image processor 320 could command image sensor 300 to sample every pixel within region 710 and to sample the remainder of the image 700 at a sampling density that employs the amount of bandwidth which is leftover distributed across the remainder of the image 700. If multiple faces are detected in image 700, then each face region 710 can be sampled at a high sampling density. The foregoing exemplary embodiments can be combined. For example, the remainder of the image 700 (other than the face region(s) 710) can be processed using one of the aforedescribed techniques wherein spatial frequency content is measured and used to allocate one or more sampling densities to regions of image sensor 300. Regardless of how sampling density(ies) are allocated to the remainder of image 700, an output of image 700 can render the face region 710 with a higher resolution than the remainder, providing a higher perceived image quality to the user. Note that the dotted line region 810 in FIG. 8 references an HD region which has been adjusted to compensate for, e.g., predicted motion of the image to be captured next by image sensor 300, as described below with respect to FIG. 10.

Figure 9:
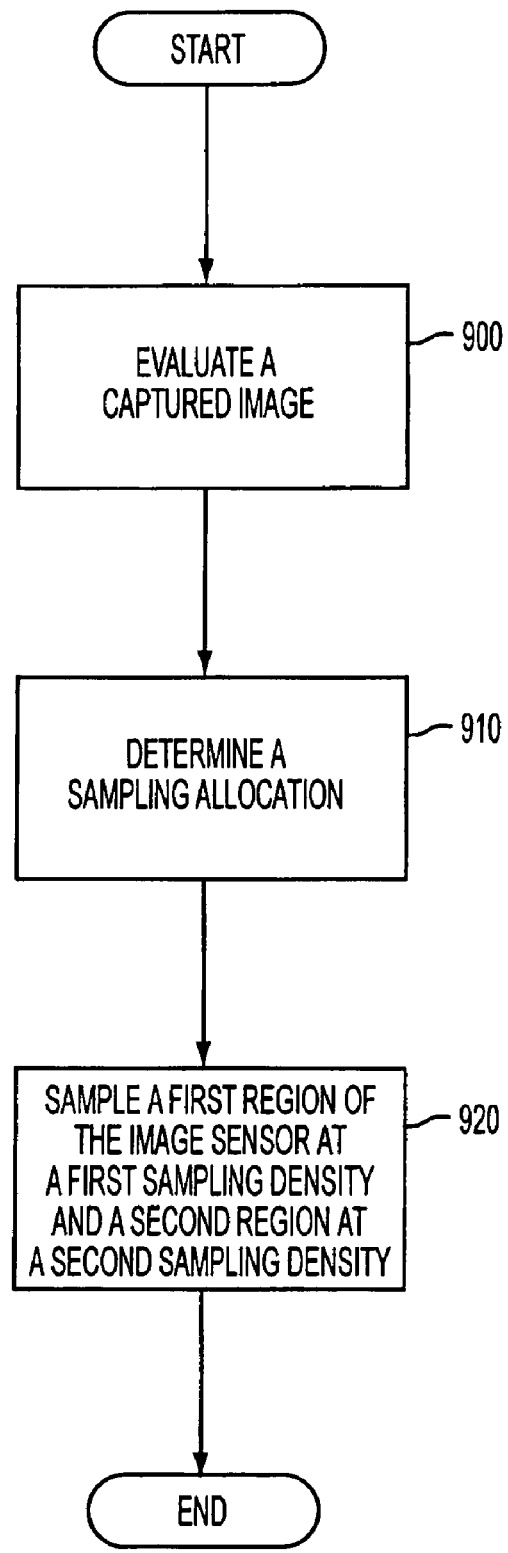
FIG. 9 is a flowchart illustrating an exemplary method of sampling an image sensor according to an exemplary embodiment of the present invention.

Numerous variations and modifications associated with the above-described exemplary embodiments can be provided. For example, although these examples depict regions (i.e., captured image regions that have been evaluated and image sensor regions having different sampling densities) as being rectangular this is not required. Either or both types of regions can have an arbitrary shape. A general method for sampling an image sensor using the aforedescribed techniques is shown in the flowchart of FIG. 9. Therein, at step 900, a captured image is evaluated, e.g., using spatial frequency analysis and/or face detection. The result(s) of this evaluation are then used to determine a sampling allocation for the image sensor at step 910. The image sensor is then sampled by sampling a first region of at a first sampling density and a second region at a second sampling density based upon the sampling allocation at step 920.

Figure 10:
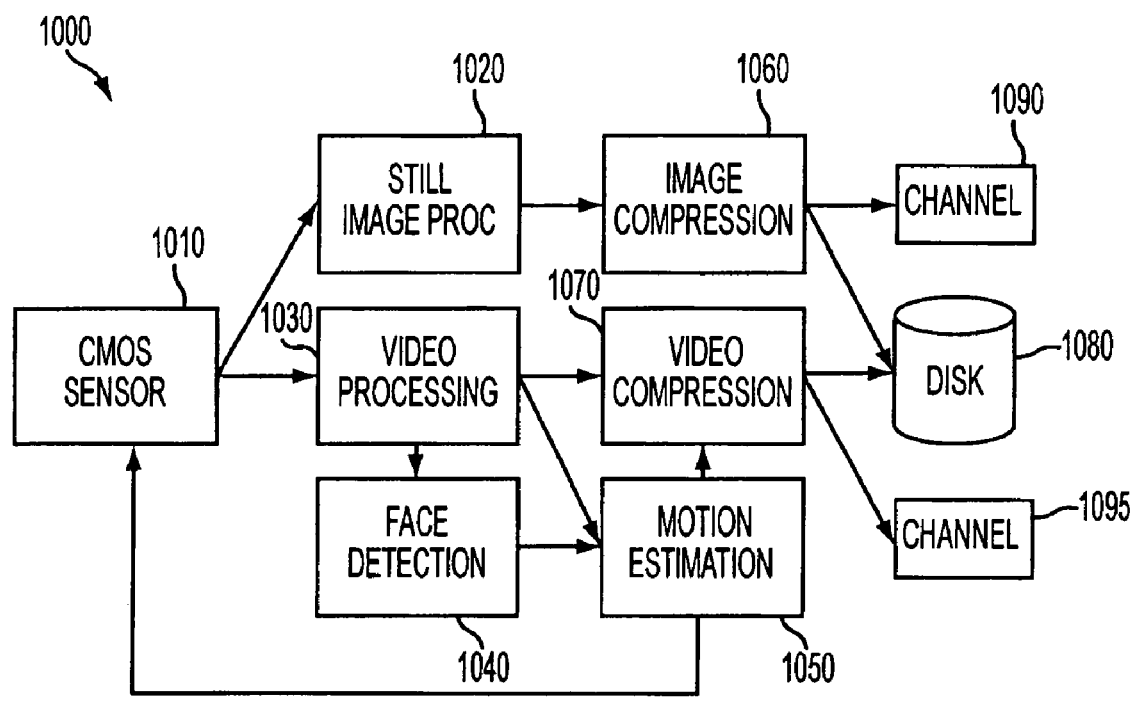
FIG. 10 is a dual pipeline architecture according to an exemplary embodiment of the present invention.

Exemplary embodiments of the present invention can be employed in many different types of imaging systems, devices and methods. FIG. 10 depicts a dual video and still image pipeline system 1000 in which the present invention can be employed. This dual pipeline architecture can include one pipeline optimized for high resolution digital still image photographs and one pipeline optimized for digital video. Image sensor sampling techniques according to the present invention can be used in conjunction with both pipelines. A CMOS sensor 1010 captures an image which is then passed to both the still image processor 1020 and the video processing unit 1030. In this example, the video processing unit 1030 can be adapted to provide various preliminary image processing functions, e.g., focusing, image previewing and image sensor sampling allocation. Thus, the video processing unit 1030 passes the captured image to the face detection unit 1040 for evaluation. As will be appreciated from the foregoing discussion, spatial frequency content detection and/or other parameter evaluations can be used instead of, or in addition to, face detection. The sampling allocation which is determined based on the output of the face detection algorithm can be adjusted due to a number of different parameters. Motion estimation unit 1050 can, for example, estimate motion of an image on a frame by frame basis. Returning to the example of FIGS. 7 and 8, motion of either the image capture device or the subject may lead the motion estimation unit 1050 to predict that the face region 710 will be offset from its current location in FIG. 7 when the next frame is captured. Thus, the HD region of FIG. 8 can be offset to region 810 prior to returning a sampling allocation command to the image sensor 300 in order to more accurately sample the expected face region in the next captured image. More generally, this example is used to indicate that the regions determined by evaluation of a captured image may not completely correspond to sampling density regions, as various other data, including motion estimation, can be used to modify the sampling allocations which are initially determined as a result of captured image analysis. The sampling allocation determined by the processor based on, e.g., face detection unit 104 and motion estimation unit 1050, is sent back to the CMOS sensor 1010 in the form of commands to reprogram the sampling scheme. The remaining blocks in FIG. 10 indicate that the processed still and/or video data can be compressed (via units 1060 and 1070, respectively) prior to being stored on, e.g., a disk 1080, or output via a channel 1090, 1095 associated therewith. The compression functions 1060 and/or 1070 can contain the DCT function which can be accessed for use if spatial frequency content is employed to determine sampling allocation. In addition to other benefits, application of image sensor sampling techniques according to the present invention to the exemplary dual pipeline image processing system of FIG. 10 can reduce the number of video frames which might otherwise be lost while a high resolution still picture is captured by, e.g., reducing the overall number of samples that are transferred from the image sensor 1010 to memory.

Similarly, exemplary embodiments of the present invention can also be implemented in digital cameras which may or may not include video image processing capabilities. For example, a digital camera which includes video image processing capabilities may include a preview feature which enables a user to preview an image using video image processing prior to storing a digital still image in the digital camera's memory. The previewed image can be processed using techniques in accordance with the present invention to determine a sampling allocation for the digital camera's image sensor(s). Then, when the user "snaps" a picture, that sampling allocation can be used to sample the data available from the sensor and store an image in the digital camera's memory. Alternatively, for digital cameras which do not include video image processing capabilities, the present invention can, for example, be implemented by processing one or more of the previously stored digital images from the digital camera's memory to determine a suitable sampling allocation for the next digital image to be taken by the user.

Systems and methods for image processing according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. Various alternatives are also contemplated by exemplary embodiments of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for sampling an image sensor comprising the steps of:
    evaluating a first captured image;
    determining a sampling allocation for said image sensor based upon said step of evaluating;
    capturing a second image by sampling a first region of said image sensor at a first sampling density and a second region of said image sensor at a second sampling density based upon said determined sampling allocation; and
    wherein the sampling provides image data of the second image comprising both a first portion having the first sampling density and a second portion having the second sampling density according to the determining.

2. The method of claim 1, wherein said step of evaluating further comprises the step of:
    processing said captured image to determine spatial frequency content associated with pixel data captured by said image sensor.

3. The method of claim 2, wherein said step of determining a sampling allocation further comprises the step of:
    assigning said first sampling density to said first region of said image sensor which has a lower spatial frequency content than that associated with said second region, wherein said first sampling density is less than said second sampling density.

4. The method of claim 1, wherein said step of evaluating further comprises the step of:
    processing said captured image to determine a region containing a face in said captured image.

5. The method of claim 4, wherein said first region includes said face and said second region includes a remainder and wherein said first sampling density is greater than said second sampling density.

6. The method of claim 1, wherein said step of evaluating further comprises the step of:
    evaluating said captured image to determine a plurality of regions, each of said plurality of regions having a different perceived quality value; and
    wherein said step of determining further comprises the step of:
    allocating more samples per unit area to those of said plurality of regions having a higher perceived quality value and allocating fewer samples per unit area to those of said plurality of regions having a lower perceived quality value.

7. The method of claim 1, wherein said step of determining said sample allocation further comprises the step of:
    determining said sample allocation as a function of a bandwidth associated with a data transfer mechanism used to output samples from said image sensor and quantitative quality values output as a result of said evaluating step.

8. The method of claim 7, wherein said function is a Lagrangian optimization.

9. A computer-readable medium encoded with a computer program that performs the steps of:
    evaluating a captured image;
    determining a sampling allocation for an image sensor based upon said step of evaluating, the image sensor being configured to produce electrical signals representing light to which the image sensor is exposed; and
    controlling the image sensor to provide sampling of a first region of said image sensor at a first sampling density and a second region of said image sensor at a second sampling density based upon said determined sampling allocation to provide another captured image.

10. The computer-readable medium of claim 9, wherein said step of evaluating further comprises the step of:
processing said captured image to determine spatial frequency content associated with pixel data captured by said image sensor.

11. The computer-readable medium of claim 10, wherein said step of determining a sampling allocation further comprises the step of:
assigning said first sampling density to said first region of said image sensor which has a lower spatial frequency content than that associated with said second region, wherein said first sampling density is less than said second sampling density.

12. The computer-readable medium of claim 9, wherein said step of evaluating further comprises the step of:
evaluating said captured image to determine a plurality of regions, each of said plurality of regions having a different perceived quality value; and
wherein said step of determining further comprises the step of:
allocating more samples per unit area to those of said plurality of regions having a higher perceived quality value and allocating fewer samples per unit area to those of said plurality of regions having a lower perceived quality value.

13. The computer-readable medium of claim 9, wherein said step of determining said sample allocation further comprises the step of:
determining said sample allocation as a function of a bandwidth associated with a data transfer mechanism used to output samples from said image sensor and quantitative quality values output as a result of said evaluating step.

14. The computer-readable medium of claim 13, wherein said function is a Lagrangian optimization.

15. An image processing device comprising:
an image sensor for capturing an image, wherein said image sensor includes an array of image sensing pixels, wherein said image sensor is controllable to vary a sampling density for at least two regions across said array of image sensing pixels;
a processor for evaluating a captured image and for allocating a first sampling density to a first region of said image sensor and a second sampling density to a second region of said image sensor based on said evaluation of said captured image; and
a data transfer mechanism for transferring samples associated with a next image from said image sensor to said processor, wherein said samples are generated based on said first and second sampling densities.

16. The image processing device of claim 15, wherein said processor evaluates said captured image to determine spatial frequency content associated with pixel data captured by said image sensor.

17. The image processing device of claim 16, wherein said processor assigns said first sampling density to said first region of said image sensor which has a lower spatial frequency content than that associated with said second region, wherein said first sampling density is less than said second sampling density.

18. The image processing device of claim 15, wherein said processor evaluates said captured image to determine a region containing a face in said captured image.

19. The image processing device of claim 15, wherein said processor evaluates said captured image to determine a plurality of regions, each of said plurality of regions having a different perceived quality value and allocates more samples per unit area of said image sensor to those of said plurality of regions having a higher perceived quality value and allocates fewer samples per unit area of said image sensor to those of said plurality of regions having a lower perceived quality value.

20. The image processing device of claim 15, wherein said processor determines said sample allocation as a function of a bandwidth associated with said data transfer mechanism and quantitative quality values output as a result of said evaluating step.

21. The image processing device of claim 20, wherein said function is a Lagrangian optimization.

22. An image processing system comprising:
means for evaluating a first captured image;
means for determining a sampling allocation for an image sensor based upon said step of evaluating; and
means for capturing a second image by sampling a first region of said image sensor at a first sampling density and a second region of said image sensor at a second sampling density based upon said determined sampling allocation.

23. The method of claim 1 further comprising capturing the first image at a first moment in time using the image sensor and wherein capturing of the second image comprises capturing the second image at a second moment in time subsequent to the first moment in time.

24. The method of claim 1 wherein the evaluating comprises identifying portions of the captured image as comprising regions having high and low frequency content, and the sampling comprises sampling to provide the image data comprising the first and second sampling densities corresponding to the first and second portions of the second image.

25. The method of claim 1 further comprising prior to the evaluating, capturing the first image using all pixels of the image sensor at a first moment in time and wherein the sampling provides the image data of the single second image using only a portion of the pixels comprising less than an entirety of the pixels of the image sensor at a second moment in time and according to the determining, the second moment in time occurring subsequent to the first moment in time.

26. The method of claim 25 wherein the evaluating comprises identifying portions of the captured image as comprising regions having high and low frequency content, and the sampling comprises sampling to provide the image data comprising the first and second sampling densities corresponding to the first and second portions of the second image.

27. The computer-readable medium of claim 9 wherein the captured image comprises a first image and the program further performs, using the sampling, capturing a single second image comprising both a first portion having the first sampling density and a second portion having the second sampling density.

28. The computer-readable medium of claim 9 wherein the captured image comprises a first image and the program further performs:
prior to the evaluating and using the image sensor, capturing first digital data representing the first image from a first number of pixels of the image sensor; and
using the sampling, capturing second digital data representing a second image, wherein the second digital data corresponds to a second number of pixels of the image sensor less than the first number of pixels.

29. The image processing device of claim 15 wherein the captured image comprises a first captured image and the next image comprises a second captured image, the second captured image being captured subsequent to the first captured image and the second captured image comprising both a first portion having the first sampling density and a second portion having the second sampling density.

30. The image processing device of claim 15 wherein:

the image sensor is configured to produce electrical signals representing light to which the image sensor is exposed; and the processor is configured to utilize the evaluation of the captured image to control the image sensor to generate the samples for the next image having the first and second densities corresponding to the first and second regions of the image sensor.

31. The device of claim 15 wherein the captured image is captured at a first moment in time and the next image is captured at a second moment in time, the second moment in time being subsequent to the first moment in time.

32. The device of claim 15 wherein the image sensor is configured to produce electrical signals representing light to which the image sensor is exposed.

33. The method of claim 23 wherein the capturing of the first image at the first moment in time comprises exposing the image sensor to first light and the capturing of the second image at the second moment in time comprises exposing the image sensor to second light, the second light being different than the first light.

* * * * *